Figure 4A:
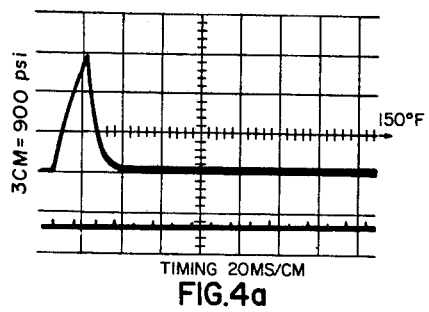

United States Patent [19]

Morris et al.

[11] 4,023,497
[45] May 17, 1977

[54] AFT-END IGNITION SYSTEM FOR ROCKET MOTOR

[75] Inventors: Elias P. Morris, Charlesbourgh; Fred A. Christie, Ste-Foy, both of Canada

[73] Assignee: Her Majesty the Queen in right of Canada, as represented by the Minister of National Defence, Ottawa, Canada

[22] Filed: Mar. 8, 1976

[21] Appl. No.: 664,856

[52] U.S. Cl. .................. 102/49.7; 60/39.82 E; 60/256
[51] Int. Cl.² ................................. F42C 19/12
[58] Field of Search ............. 102/49.7, 70, 70.2 A; 60/39.82 R, 39.82 E, 256

[56] References Cited
UNITED STATES PATENTS

| | | | |
|---|---|---|---|
| 2,776,623 | 1/1957 | Bonner | 60/256 |
| 2,990,683 | 7/1961 | Walden | 102/70.2 A |
| 3,251,267 | 5/1966 | Hauser et al. | 102/49.7 |
| 3,746,214 | 7/1973 | Stephenson | 102/21.8 |
| 3,974,772 | 8/1976 | Pelham | 102/70.2 A |

FOREIGN PATENTS OR APPLICATIONS

| | | | |
|---|---|---|---|
| 716,835 | 8/1965 | Canada | 102/49.7 |
| 1,216,169 | 5/1966 | Germany | 102/49.7 |

Primary Examiner—Verlin R. Pendegrass
Attorney, Agent, or Firm—Lawrence I. Field

[57] ABSTRACT

An igniter for a rocket motor consisting of a cylindrical tube having an open end and a closed end, a reduced section at the closed end, a plurality of segments extending outwardly from near the closed end, a squib secured in the reduced section, a charge in the tube and a polyurethane foam plug in the open end of the tube.

4 Claims, 9 Drawing Figures

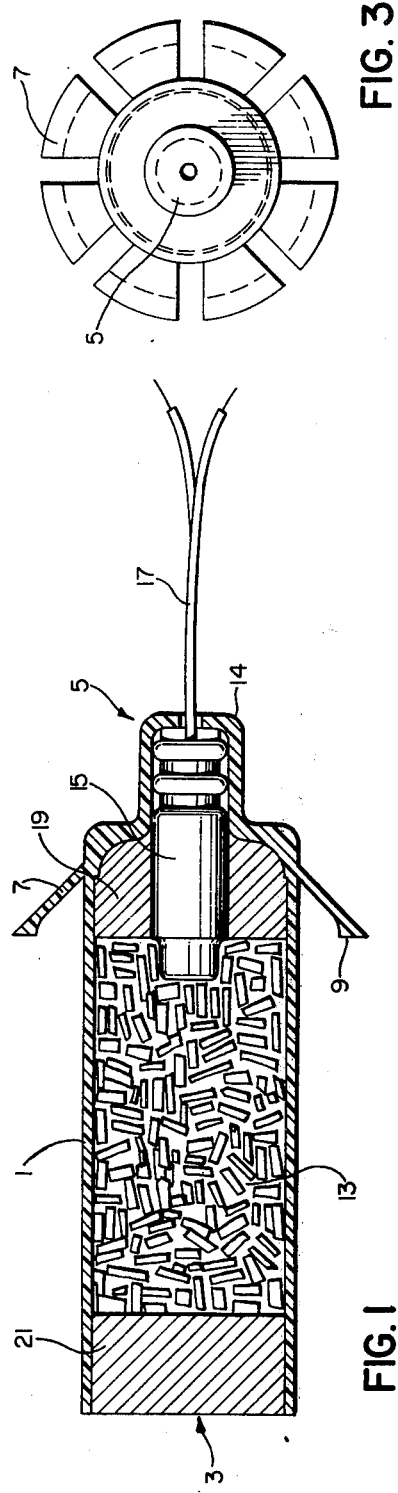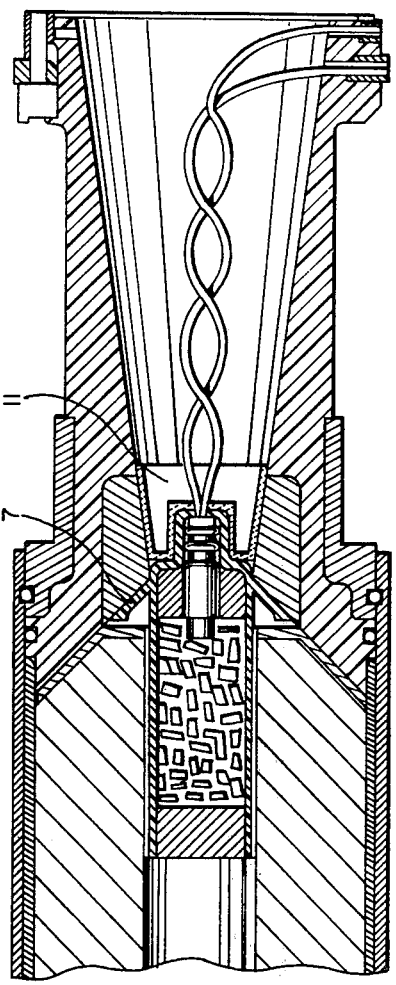
FIG. 1  FIG. 2  FIG. 3

AFT-END IGNITION SYSTEM FOR ROCKET MOTOR

This invention relates to an igniter for a rocket motor and in particular an igniter for use with a rocket motor having a single-port nozzle wherein, because of the insulation configuration at the head-end of the motor, ignition must be achieved from the aft end of the motor.

An igniter consists of a pyrotechnic charge housed in a container together with a squib or percussion cap. The squib is initiated using an electric current, the energy released by the squib igniting the pyrotechnic charge, which in turn must uniformly ignite the entire exposed surface of the propellant grain.

This invention is related to a rocket for use in military operations which requires that reliable performance be maintained even though the igniter is subjected to a wide variety of environmental extremes. The nozzle-end ignition system must ignite the rocket motor reliably, without ignition spikes or hang-fires, over a temperature range of approximately −65° F. to 150° F. The pyrotechnic charge must not be allowed to crack or fragment when subjected to vibration or thermal shocks, and the igniter must be installed as an integral part of the rocket yet result in small lightweight ejecta fragments.

The great majority of rocket motors are ignited using igniters fixed to the head end of the rocket motor. Front end igniters must be made strong enough to remain intact during the entire burning time, since the ejection of large pieces of material could damage the rocket or the following aircraft, or cause unstable combustion and consequently elevated operating pressures.

Very few rocket motors use aft-end ignition. Large rocket motors occasionally use pyrogen igniters mounted on an outside structure precisely located in the expansion cone of their nozzle. A 2.75 inch Folding Fin Aircraft Rocket motor manufactured by Aerojet Solid Propulsion Company uses aft-end ignition. However the rocket uses a four-port nozzle configuration which provides space in the center of the aft closure upon which the igniter is mounted.

None of the ignition systems known can meet the design requirements as mentioned above and be acceptable for aircraft launching.

Head-end ignition is not acceptable for aircraft use since the ejection of for instance 30-inch long igniter lead wires is not permissible, and installation of the lead wires under the insulation to prevent the ejection thereof has proved to be not practical.

External nozzle-end igniters are also inacceptable due to the requirement for a self-contained rocket unit. Internal nozzle-end igniters, which remain in place during the full burning time, require additional space and costly structures and these two requirements cannot be tolerated in an inexpensive small-diameter rocket motor.

The solution of the problem, as solved by the inventors, consists of the use of a lightweight frangible plastic igniter located between the end of the propellant grain and the inlet of the nozzle which will ignite the rocket motor and then be ejected in relatively small pieces out throught the nozzle.

The igniter generally consists of a plastic tube, an ignition charge, a squib, a foam igniter seal and foam charge cushions.

Figure 5A:
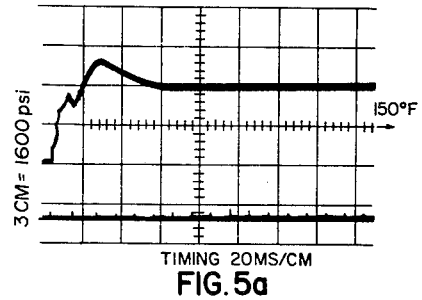
Figure 4B:
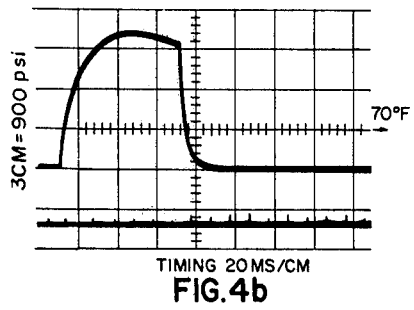
Figure 5B:
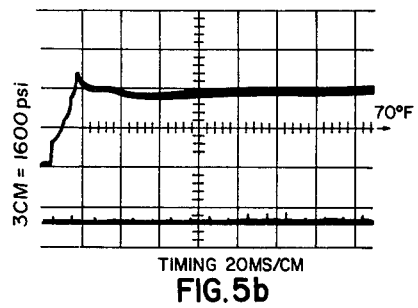
Figure 4C:
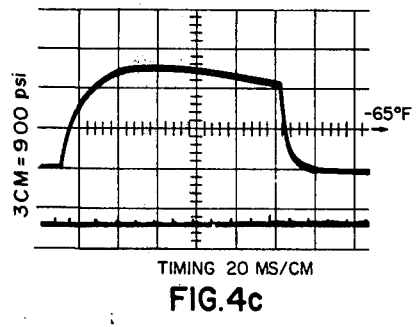
Figure 5C:
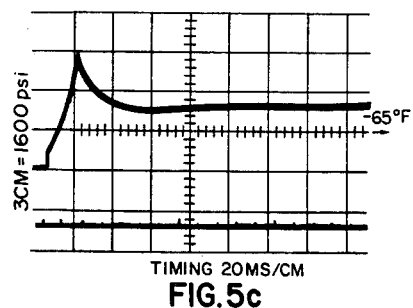

The invention will now be described with reference to the accomanying drawings in which FIG. 1 is a schematic elevational view of an embodiment of the igniter of this invention, FIG. 2 is an elevation view of part of the rocket motor showing the igniter of FIG. 1 in place, FIG. 3 is an end view of the igniter of FIG. 1, FIGS. 4a –4c are a set of pressure-time curves obtained from ignition tests on a dummy motor, and FIGS. 5a –5c are a set of pressure-time curves obtained from live motor ignition tests.

Referring to the drawings, the igniter of this invention has a body consisting of a tube 1 preferably made from a material containing 30% glass fibre and 70% Nylon. The tube has an open end 3 and a closed end of reduced diameter 5. A number of equally spaced petal-shaped segments 7 extend at an angle to the central axis of the tube from the largest diameter of the closed end of the tube. Each segment 7 has an outer end 9 which is thickened and pointed inwardly. From FIG. 2, it will be seen that the segments 7 hold the igniter in place in the nozzle throat 11 of a rocket motor, and are sized such that when the igniter is pushed out through the nozzle throat during burning, they bend inwardly and the thickened ends 9 are pushed against the wall of the tube 1 to cause breaking of the tube. The fit of the tube in the nozzle throat is quite important in that if it is too tight it will be retained in the nozzle throat for too long so causing ignition over-pressure, whereas if the tube is too loose, there is an early ejection of the igniter and poor flame-spread during light-up. A preferable tube for a 2.75 inch diameter rocket will weigh approximately 5.47 grams, and during testing it has been found that such a tube will break into pieces none of which are greater than 1.3 to 2.3 grams.

The preferred ignition charge 13 which is used in the igniter is boron potassium nitrate pellets which will be thereafter referred to as BPN pellets. For a 2.75 inch diameter rocket, the amount of BPN pellets used will be approximately 8 grams and the pellets will preferably be 0.125 inch diameter cylinders of 0.188 inch length. BPN is a widely used pyrotechnic material which is of acceptable cost, has a high heat of reaction, and is capable of withstanding long-term storage with a minimum of degradation. The preferred choice of charge weight and pellet size were decided after preliminary tests which showed that good ignition could be obtained with this size of pellet. A charge of uniform sized pellets makes for simplicity of production and with this size referred to above there is good coverage along the entire length of the grain perforation, which is required for smooth rapid light-up and efficient use of the pyrotechnic charge. Therefore there is a low rate of expulsion of partially burned pellets.

In order to ignite the ignition charge, a squib 15 is used and this squib is held in the tube 1 by an adhesive, such as that sold by the Armstrong Company of the United States under their part No. A 34, in the reduced section 14 of the closed end 5. The electrical leads 17 for the squib pass through a small aperture in the closed end.

The electrical characteristics of a suitable squib are a maximum no-fire current of 0.25 amperes for 2 minutes, a minimum sure-fire current of 0.50 amperes for 5 minutes, and a resistance of 1.50 ± 0.40 ohms.

Around the squib 15 is a polyurethane foam cushion 19 which both seals the space around the squib so preventing movement of the ignition charge which would cause powdering and cracking of the charge during the periods of vibration, and provides an alternative path for the squib flame on the rare occasions when rupture of the housing of the squib may occur upon ignition instead of rupture of the end of the squib.

A plug 21 of polyurethane foam is glued into the end of the tube 1 to retain the pellets in the tube during handling of the igniter and the assembled rocket motor. The plug 21 also acts as a springy cushion for the pyrotechnic pellets thus preventing excessive movement and consequent powdering or cracking of the pellets during periods of intense vibration. This is quite an important function as ignition spikes are created during burning when there are high concentrations of small particles in an ignition charge. The type of polyurethane foam suitable for use as a cushion 19 and a plug 21 is that sold by The Monsanto Company in the United States under Specification No. 3865F, and a suitable adhesive to hold the plug 21 in place is that sold by Armstrong Company of the United States under their part number A-34.

An approved way of testing and characterizing igniters is to fire them in an inert motor having the same grain perforation geometry as the live motor and with the same type of nozzle. Igniters having the structure disclosed were fired in this manner at −65° F, 70° F and 150° F. Oscilloscope pictures of the pressure-time curves obtained at these temperatures are shown in FIG. 4. Unlike conventional head-end ignition, the area under the curves increases as the temperature decreases, indicating that greater amounts of energy are available for the conditions under which it is most difficult to ignite composite propellant grains. Thus this aft-end system facilitates the ignition of composite propellants at low temperatures. FIG. 5 shows the ignition phase pressure-time record of three live motors fired at the same temperatures as used with the inert motor. The rates of pressurization are very similar for those fired at 70° F. and −65° F., the ignition delays being respectively 0.016 seconds and 0.020 seconds. The igniter tubes are expelled coincident with the ignition peak pressures of 1600 pounds per square inch and 1400 pounds per square inch respectively.

The rate of pressurization for the motor fired at 150° F. reverses briefly at 850 pounds per square inch when the igniter tube is expelled (normal behaviour) and then continues to increase to an ignition peak pressure of 1426 pounds per square inch. The ignition delay of 0.022 seconds is typical. Extensive testing has shown that the results indicated in FIG. 5 are typical. The igniter was also submitted to vibration testing on several occasions and functioned satisfactorily afterwards with no evidence of hang-fires or over-pressure spikes.

We claim:

1. An igniter for a rocket motor consisting of a cylindrical tube having an open end and a closed end, a reduced section at the closed end, a plurality of segments extending outwardly from near the closed end and towards the open end; a squib secured in the reduced section, a charge in the tube and a polyurethane foam plug in the open end of the tube, the segments being of such a flexibility and strength that during the detonation of the squib, the igniter is first held in place and then is permitted to move so bending the segments inwardly until they contact and break the cylindrical tube and hence initiate total collapse and ejection of the igniter.

2. The igniter of claim 1, including a polyurethane foam cushion around the squib the charge being immovably held between the plug and the cushion.

3. The igniter of claim 1 wherein the tube is made from a material consisting of 30% glass fibre and 70% Nylon.

4. The igniter of claim 1 wherein the charge is boron potassium nitrate pellets each of 0.125 inch diameter and 0.188 inch length.

* * * * *